(12) United States Patent
Sanchit et al.

(10) Patent No.: US 12,731,216 B2
(45) Date of Patent: Sep. 8, 2026

(54) CLASS-BASED TRAINING OF A MACHINE LEARNING MODEL FOR IMAGE PROCESSING

(71) Applicant: Canva Pty Ltd, Surry Hills (AU)

(72) Inventors: Sanchit Sanchit, Vienna (AT); Alexander Tack, Vienna (AT)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 19/339,292

(22) Filed: Sep. 24, 2025

(65) Prior Publication Data

US 2026/0024176 A1 Jan. 22, 2026

Related U.S. Application Data

(63) Continuation of application No. 18/600,679, filed on Mar. 9, 2024.

(30) Foreign Application Priority Data

Mar. 17, 2023 (AU) ................................ 2023201686

(51) Int. Cl.
*G06T 5/60* (2024.01)
*G06T 11/60* (2026.01)
*G06V 10/764* (2022.01)

(52) U.S. Cl.
CPC ................ *G06T 5/60* (2024.01); *G06T 11/60* (2013.01); *G06V 10/764* (2022.01)

(58) Field of Classification Search
CPC .......... G06T 5/60; G06T 11/60; G06V 10/764
(Continued)

(56) References Cited

U.S. PATENT DOCUMENTS 10,049,308 B1 8/2018 Dhua et al.
11,069,030 B2 7/2021 Shen et al.
(Continued)

FOREIGN PATENT DOCUMENTS

CN 111932462 B 11/2020
CN 113763296 A 12/2021
(Continued)

OTHER PUBLICATIONS

Sharma, Vivek, et al. "Classification-driven dynamic image enhancement." Proceedings of the IEEE Conference on Computer Vision and Pattern Recognition. 2018. (Year: 2018).*
(Continued)

*Primary Examiner* — Henok Shiferaw
*Assistant Examiner* — Dion J Satcher
(74) *Attorney, Agent, or Firm* — GrowIP Law Group LLC

(57) ABSTRACT

Methods of training a machine learning model for image processing are described. A method of training includes utilising as a learning objective a reduction or minimisation of a combination of both an image loss and a classification loss. A method of training includes utilising unsupervised images pairs generated by applying a selected degradation model to a target image, the selected degradation model being selected based on classification information associated with the target image. Methods for generating unsupervised image pairs and methods for image processing using a trained machine learning model are also described, together with computer systems and computer-readable storage for performing the various methods.

15 Claims, 5 Drawing Sheets

(58) Field of Classification Search
USPC .......................................................... 382/159
See application file for complete search history.

(56) References Cited

U.S. PATENT DOCUMENTS

| | | | | |
|---|---|---|---|---|
| 11,182,877 | B2 | 11/2021 | Zhu et al. | |
| 11,341,367 | B1 | 5/2022 | Barbosa et al. | |
| 11,455,753 | B1 | 9/2022 | Alemi et al. | |
| 11,983,853 | B1* | 5/2024 | Zhu | G06T 5/70 |
| 2016/0284070 | A1 | 9/2016 | Pettigrew et al. | |
| 2019/0043210 | A1 | 2/2019 | Chui et al. | |
| 2019/0139262 | A1 | 5/2019 | Wang et al. | |
| 2019/0362475 | A1* | 11/2019 | Lin | G06T 5/92 |
| 2020/0110994 | A1 | 4/2020 | Goto et al. | |
| 2020/0226421 | A1* | 7/2020 | Almazan | G06V 20/52 |
| 2020/0334532 | A1* | 10/2020 | Zuev | G06N 3/0464 |
| 2020/0342652 | A1 | 10/2020 | Rowell et al. | |
| 2020/0380293 | A1 | 12/2020 | Finnie et al. | |
| 2021/0004631 | A1 | 1/2021 | Wang | |
| 2021/0150764 | A1 | 5/2021 | Kuo et al. | |
| 2021/0201464 | A1* | 7/2021 | Tariq | G06V 20/56 |
| 2022/0004823 | A1 | 1/2022 | Shoshan et al. | |
| 2022/0261965 | A1* | 8/2022 | Ji | G06N 3/09 |
| 2023/0040122 | A1 | 2/2023 | Park et al. | |
| 2023/0298142 | A1* | 9/2023 | Lin | G06T 5/50 382/255 |
| 2024/0135496 | A1 | 4/2024 | Dudhane et al. | |

FOREIGN PATENT DOCUMENTS

| | | | |
|---|---|---|---|
| CN | 115115910 | A | 9/2022 |
| CN | 115424013 | A | 12/2022 |
| CN | 115511733 | A | 12/2022 |
| CN | 115760605 | A | 3/2023 |
| WO | 2022179586 | A1 | 9/2022 |
| WO | 2023000872 | A1 | 1/2023 |

OTHER PUBLICATIONS

Lore, Kin Gwn, Adedotun Akintayo, and Soumik Sarkar. "LLNet: A deep autoencoder approach to natural low-light image enhancement." Pattern Recognition 61 (2017): 650-662. (Year: 2017).*

Gao, Yuan et al., "NDDR-CNN: Layerwise Feature Fusing in Multi-Task CNNs by Neural Discriminative Dimensionality Reduction," arXiv:1801.08297v4, pp. 3205-3214, Apr. 4, 2019.

Rad, Mohammad Saeed, "Benefiting from multitask learning to improve single image super-resolution," Neurocomputing 398 (2020): 304-313. (Year: 2020).

* cited by examiner

CLASS-BASED TRAINING OF A MACHINE LEARNING MODEL FOR IMAGE PROCESSING

CROSS-REFERENCE TO RELATED APPLICATIONS

This application is a continuation application of U.S. Non-Provisional application Ser. No. 18/600,679, filed on Mar. 9, 2024, that claims priority to Australian Patent Application No. 2023201686, filed Mar. 17, 2023, which are each hereby incorporated by reference in their entirety.

FIELD OF THE DISCLOSURE

The present disclosure relates to the field of image processing. Particular embodiments relate to a method of enhancement of a digital image through changes to one or more visual parameters of the digital image, the changes identified using a computer or computer system implementing a machine learning solution. Other embodiments relate to a computer processing system or computer-readable storage configured to perform such a method.

BACKGROUND

Digital images, for example photos or videos stored as data, are pervasive in modern society. They can be and often are generated using a digital camera. There is now a high availability of digital cameras, including on multifunction devices like smart phones, in addition to dedicated cameras. Digital cameras have a diverse range of specifications, including relating to the lens size, number of lenses and in image capture hardware. Digital images may be generated by other mechanisms, for example using computer applications and in recent times there has been significant discussion of the use of artificial intelligence to generate digital images, including artwork.

Software or firmware may automatically process digital image data, for example digital image data generated by the image capture hardware of a digital camera or digital image data received from or via another source. Software or firmware may also or instead allow for the manual adjustment of visual parameters of digital image data, including for example to process the digital image in response to a manual input to adjust of one or more of brightness, saturation and contrast. The software or firmware may form a part of a digital camera or other image generator, or may be run on a computer system separate from the digital camera or other image generator, which computer system has received digital image data for processing.

The software or firmware for processing digital images may be deployed to enhance the image. The enhancement may aim to make the image more aesthetically pleasing. The enhancement may also or instead aim to make the image clearer or enable information from the image to the more readily discerned. The present disclosure relates to methods for using machine learning based solutions to image processing, for example to allow for image enhancement.

SUMMARY OF THE DISCLOSURE

Embodiments of a method of training a machine learning model are described. The embodiments have particular application to training a machine learning model to perform image processing, for example image enhancement.

In some embodiments, the method of training includes utilising as a learning objective a reduction or minimisation of a combination of both: i) a first loss, wherein the first loss is a loss between an output image of the machine learning model that applies at least one visual parameter and a target training image and ii) a second loss, wherein the second loss is a loss between a classification output and a known classification of the target training image. In some embodiments the method of training includes reducing or minimising a combination of both the first loss and the second loss together with utilising for the training unsupervised image pairs as described below.

In some embodiments, the method of training includes utilising one or more unsupervised images pairs, wherein an unsupervised image pair is one in which the degraded image has been generated by a computational process based on the target image of the unsupervised image pair. The computational process includes applying a selected degradation model to the target image, the selection of the degradation model for use in generating an unsupervised being based on classification information associated with the target image of the unsupervised pair.

Embodiments of a method for generating image pairs for training a machine learning model for image processing are described.

In some embodiments, the method for generating the image pairs includes receiving a set of training images and scene information for the set of training images and selecting and applying one of a plurality of degradation models to the set of training images to form a set of degraded images corresponding to the set of training images, wherein the selecting is based on the scene information. Each degraded image and corresponding training image forms an image pair for training a machine learning model.

Embodiments of training a machine learning model for image processing that utilise the generated image pairs are also described.

Embodiments of a method of image processing are also described. The embodiments include embodiments that utilise a machine learning model that has been trained according to one of the embodiments of a method of training described herein.

Computer processing systems and non-transitory computer-readable storage storing instructions for a computer processing system are also described, which are configured to perform the methods disclosed herein.

Further embodiments will become apparent from the following description, given by way of example and with reference to the accompanying drawings.

DETAILED DESCRIPTION OF THE EMBODIMENTS

A machine learning solution to image processing tasks is implemented by a computer system. In particular, the computer system includes one or more data processing devices configured, for example by software, to perform a data processing method in accordance with the machine learning solution. The data processing method may be on one or more digital images in local or remote data non-transitory storage or which have been received over a communication channel and stored in transitory storage.

Figure 1:
FIG. 1 shows an example of a computer system, in the form of a client server architecture.
Figure 1:
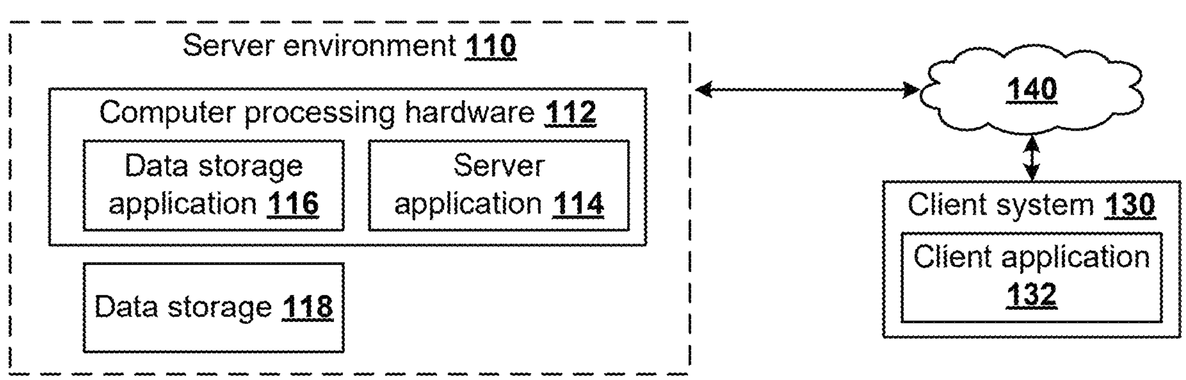

FIG. 1 shows an example of a computer system, in the form of a client server architecture, for image processing tasks. A networked environment 100 includes a server environment 110 and a client system 130, which communicate via one or more communications networks 140, for example the Internet.

Generally speaking, the server environment 110 includes computer processing hardware 112 on which one or more applications are executed that provide server-side functionality to client applications. In the present example, the computer processing hardware 112 of the server environment 110 runs a server application 114, which may also be referred to as a front end server application, and a data storage application 116.

The server application 114 operates to provide an endpoint for a client application, for example a client application 132 on the client system 130, which is accessible over communications network 140. To do so, the server application 114 may include one or more application programs, libraries, application programming interfaces (APIs) or other software elements that implement the features and functions that are described herein, including for example to provide image processing. By way of example, where the server application 114 serves web browser client applications, the server application 114 will be a web server which receives and responds to, for example, HTTP application protocol requests. Where the server application 114 serves native client applications, the server application 114 will be an application server configured to receive, process, and respond to API calls from those client applications. The server environment 110 may include both web server and application server applications allowing it to interact with both web and native client applications.

In addition to the specific functionality described herein, the server application 114 (alone or in conjunction with other applications) may provide additional functions that are typically provided by server systems—for example user account creation and management, user authentication, and/or other server side functions.

The data storage application 116 operates to receive and process requests to persistently store and retrieve data in data storage that is relevant to the operations performed/services provided by the server environment 110. Such requests may be received from the server application 114, other server environment applications, and/or in some instances directly from client applications such as the client application 132. Data relevant to the operations performed/services provided by the server environment may include, for example, user account data, image data and/or other data relevant to the operation of the server application 114. The data storage is provided by one or more data storage devices that are local to or remote from the computer processing hardware 112. The example of FIG. 1 shows data storage 118 in the server environment 110 and the following description is made with reference to this device. The data storage 118 may be, for example one or more non-transitory computer readable storage devices such as hard disks, solid state drives, tape drives, or alternative computer readable storage devices.

In the server environment 110, the server application 114 persistently stores data to the data storage 118 via the data storage application 116. In alternative implementations, however, the server application 114 may be configured to directly interact with the data storage 118 to store and retrieve data, in which case a separate data storage application may not be needed. Furthermore, while a single data storage application 116 is described, the server environment 110 may include multiple data storage applications. For example one data storage application 116 may be used for user data, another for image data. In this case, each data storage application may interface with one or more shared data storage devices 118 and/or one or more dedicated data storage devices 118, and each data storage application may receive/respond to requests from various server-side and/or client-side applications, including, for example the server application 114.

As noted, the server application 114 and data storage application 116 run on (or are executed by) computer processing hardware 112. The computer processing hardware 112 includes one or more computer processing systems. The precise number and nature of those systems will depend on the architecture of the server environment 110.

For example, in one implementation a single server application 114 runs on its own computer processing system and a single data storage application 116 runs on a separate computer processing system. In another implementation, a single server application 114 and a single data storage application 116 run on a common computer processing system. In yet another implementation, the server environment 110 may include multiple server applications running in parallel on one or multiple computer processing systems.

Communication between the applications and computer processing systems of the server environment 110 may be by any appropriate means, for example direct communication or networked communication over one or more local area networks, wide area networks, and/or public networks (with a secure logical overlay, such as a VPN, if required).

The present disclosure describes various operations that are performed by applications of the server environment 110. Generally speaking, however, operations described as being performed by a particular application (e.g. server application 114) could be performed by one or more alternative applications, and/or operations described as being performed by multiple separate applications could in some instances be performed by a single application. Also the various operations may be performed in an environment other than a client server architecture. For example the various operations may be performed on a standalone computer system.

The client system 130 hosts the client application 132 which, when executed by the client system 130, configures the client system 130 to provide client-side functionality/interact with sever environment 110 or more specifically, the server application 114 and/or other application provided by the server environment 110. Via the client application 132, a user can perform various operations such as receiving image data from another device such as a peripheral or from another computer, causing the displaying of images corresponding to the image data, and sending and receiving image data to and from the server environment.

The client application 132 may be a general web browser application which accesses the server application 114 via an appropriate uniform resource locator (URL) and communicates with the server application 114 via general world-wide-web protocols (e.g. http, https, ftp). Alternatively, the client application 132 may be a native application programmed to communicate with server application 114 using defined API calls.

The client system 130 may be any computer processing system which is configured or is configurable by hardware, firmware and/or software to offer client-side functionality. A client system 130 may be a desktop computer, laptop computers, tablet computing device, mobile/smart phone, or other appropriate computer processing system. Similarly, the applications of the server environment 110 are also executed by one or more computer processing systems. Server environment computer processing systems will typically be server systems, though again may be any appropriate computer processing systems.

Figure 2:
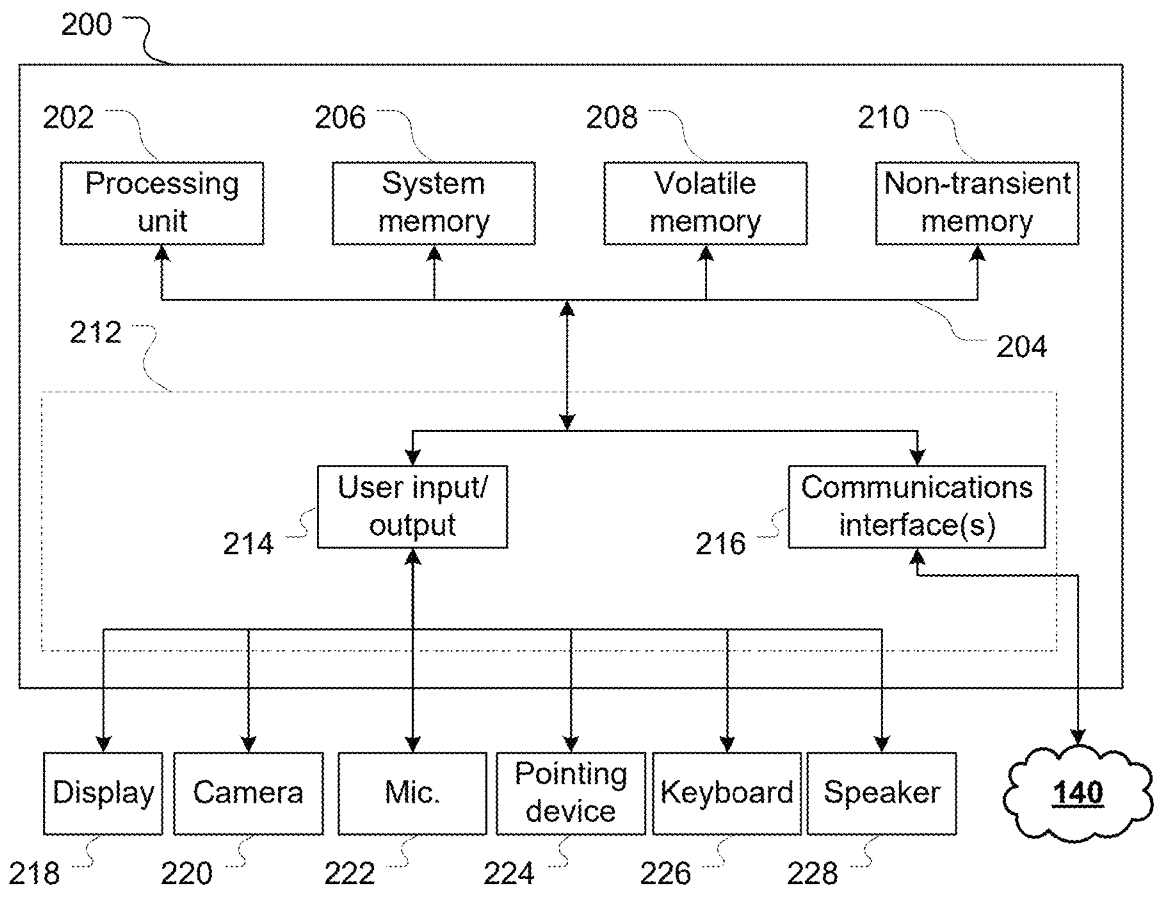
FIG. 2 shows a block diagram of a computer processing system.

FIG. 2 provides a block diagram of a computer processing system 200 configurable to implement operations described herein. The computer processing system 200 is a general purpose computer processing system. As such a computer processing system in the form shown in FIG. 2 may, for example, form a standalone computer processing system, form all or part of computer processing hardware 112, including data storage 118, or form all or part of the client system 130 (see FIG. 1). Other general purpose computer processing systems may be utilised in the system of FIG. 1 instead.

It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

The computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) the computer processing system 200.

Through a communications bus 204 the processing unit 202 is in data communication with one or more machine readable storage (memory) devices which store computer readable instructions and/or data which are executed by the processing unit 202 to control operation of the processing system 200. In this example the computer processing system 200 includes a system memory 206 (e.g. a BIOS), volatile memory 208 (e.g. random access memory such as one or more DRAM modules), and non-transitory memory 210 (e.g. one or more hard disk or solid state drives).

The computer processing system 200 also includes one or more interfaces, indicated generally by 212, via which computer processing system 200 interfaces with various devices and/or networks. Generally speaking, other devices may be integral with the computer processing system 200, or may be separate. Where a device is separate from the computer processing system 200, connection between the device and the computer processing system 200 may be via wired or wireless hardware and communication protocols, and may be a direct or an indirect (e.g. networked) connection.

Wired connection with other devices/networks may be by any appropriate standard or proprietary hardware and connectivity protocols. For example, the computer processing system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, the computer processing system 200 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which the computer processing system 200 connects-whether by wired or wireless means-include one or more input devices to allow data to be input into/received by the computer processing system 200 and one or more output devices to allow data to be output by the computer processing system 200. Example devices are described below, however it will be appreciated that not all computer processing systems will include all mentioned devices, and that additional and alternative devices to those mentioned may well be used.

For example, the computer processing system 200 may include or connect to one or more input devices by which information/data is input into (received by) the computer processing system 200. Such input devices may include keyboard, mouse, trackpad, microphone, accelerometer, proximity sensor, GPS, and/or other input devices. The computer processing system 200 may also include or connect to one or more output devices controlled by the computer processing system 200 to output information. Such output devices may include devices such as a display (e.g. a LCD, LED, touch screen, or other display device), speaker, vibration module, LEDs/other lights, and/or other output devices. The computer processing system 200 may also include or connect to devices which may act as both input and output devices, for example memory devices (hard drives, solid state drives, disk drives, and/or other memory devices) which the computer processing system 200 can read data from and/or write data to, and touch screen displays which can both display (output) data and receive touch signals (input). The user input and output devices are generally represented in FIG. 2 by user input/output 214.

By way of example, where the computer processing system 200 is the client system 130 it may include a display 218 (which may be a touch screen display), a camera device 220, a microphone device 222 (which may be integrated with the camera device), a pointing device 224 (e.g. a mouse, trackpad, or other pointing device), a keyboard 226, and a speaker device 228.

The computer processing system 200 also includes one or more communications interfaces 216 for communication with a network, such as network 140 of environment 100 (and/or a local network within the server environment 110). Via the communications interface(s) 216, the computer processing system 200 can communicate data to and receive data from networked systems and/or devices.

The computer processing system 200 may be any suitable computer processing system, for example, a server computer system, a desktop computer, a laptop computer, a netbook computer, a tablet computing device, a mobile/smart phone, a personal digital assistant, or an alternative computer processing system.

The computer processing system 200 stores or has access to computer applications (also referred to as software or programs)—i.e. computer readable instructions and data which, when executed by the processing unit 202, configure the computer processing system 200 to receive, process, and output data. Instructions and data can be stored on non-transitory memory 210. Instructions and data may be transmitted to/received by the computer processing system 200 via a data signal in a transmission channel enabled (for example) by a wired or wireless network connection over an interface, such as communications interface 216.

Typically, one application accessible to the computer processing system 200 will be an operating system application. In addition, the computer processing system 200 will store or have access to applications which, when executed by the processing unit 202, configure system 200 to perform various computer-implemented processing operations described herein. For example, and referring to the networked environment of FIG. 1 above, server environment 110 includes one or more systems which run a server application 114, a data storage application 116. Similarly, client system 130 runs a client application 132.

In some cases part or all of a given computer-implemented method will be performed by the computer processing system 200 itself, while in other cases processing may be performed by other devices in data communication with system 200.

Figure 3:
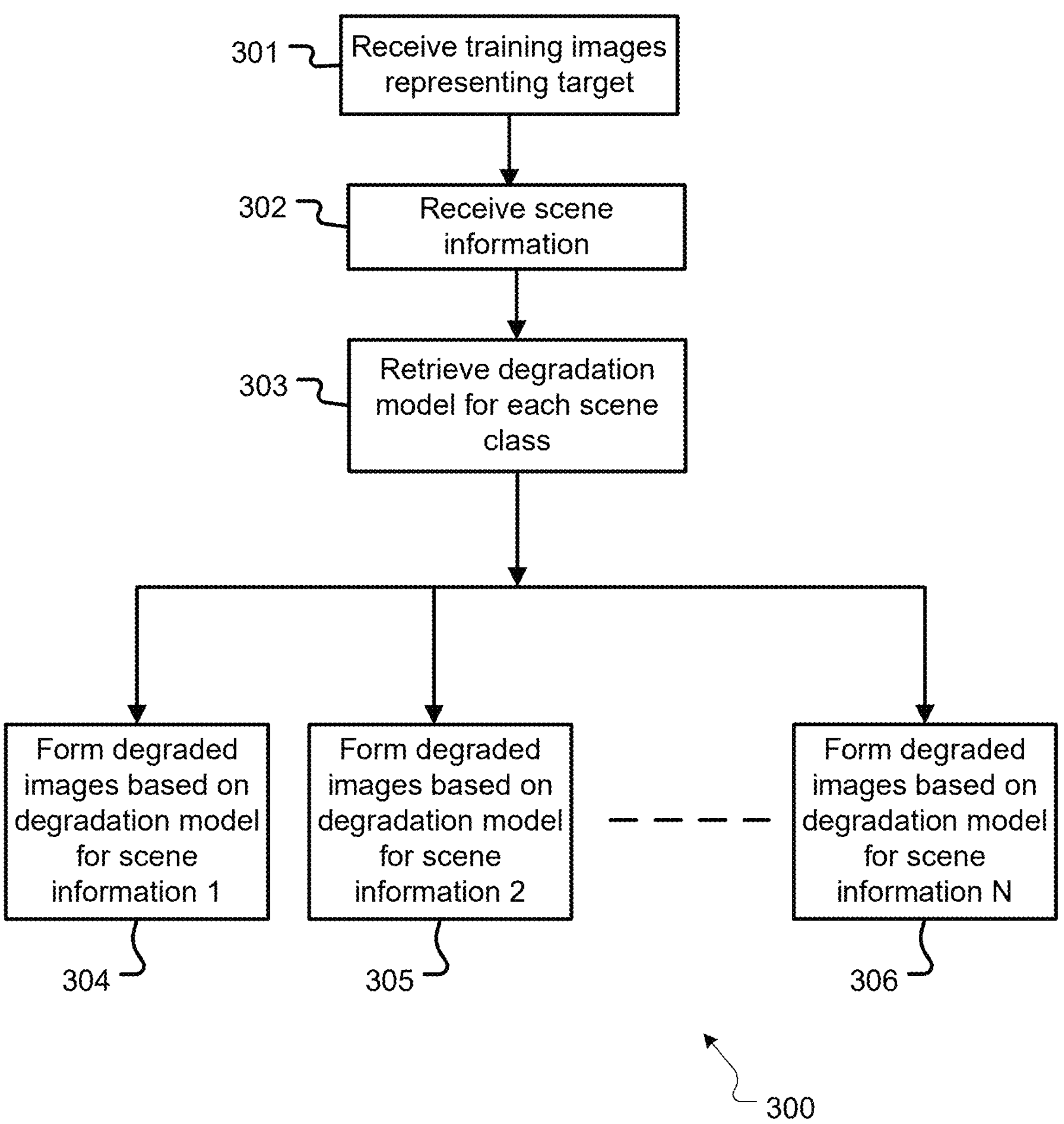
FIG. 3 shows a method for generating a set of training images for supervised machine based learning.

FIG. 3 shows an embodiment of a method 300, performed by a data processing system. The operations of the method 300 may be performed, for example, by an instance of the computer processing system 200.

The method 300 is a method for generating a set of training images for supervised machine based learning. The method 300 may be performed during the machine based learning, or as an antecedent to machine based learning. The arrangement of steps in FIG. 3 is not intended to limit the disclosure to only the order of steps shown, or intended to limit the disclosure to only serial or only parallel processing for any steps.

In step 301 a set of training images are received. The training images represent a target for visual parameter adjustment of a digital image. In particular, after image enhancement of images that are degraded in one or more respects with respect to a training image, a trained image enhancement model will enhance the image to be closer to or to match the training image. The images received at step 301 are referred to herein as "target training images".

Therefore, in some embodiments the set of target training images represent high quality images. By way of illustration, the target training images may be photographs taken by professional photographers, optionally with additional quality review to remove any photographs deemed not to be in line with the target quality. In other embodiments the set of target training images represent images that have been generated to achieve a particular look or style, whether or not they are viewed as high quality according to other measures. For example, the target training images may be deemed to be high quality due to being colour-balanced images.

A large set of target training images is useful for machine learning. By way of example, there may be 5,000 to 100,000 training images, or any number in-between. In other examples there may be more than 100,000 training image.

In step 302 scene information is received. Each of the target training images has associated scene information. The scene information identifies scene types or categories or classes (hereinafter "scene class" is used to refer to a scene type, category or class), so that there is a set of possible scene classes of $\{1 \text{ to } N\}$. Therefore, the scene information may be described as being or defining classification information. Each of the received training images may be associated with a single scene class.

The target training images and the scene information associated with the target training images may be received together. For example, metadata of the data file of each of the target training images may identify the scene information. Alternatively, the association may be indicated by a file separate to the image file, for example in a lookup table that identifies each target training image and provides the associated scene information or by all images of a scene class being stored together, for example in the same directory, different from a directory used for another scene class or other scene classes.

In general, for at least two of the scene classes, up to all of the scene classes, a target, for example a target of what is perceived to be a high quality image, is different. For example, for a scene class of people (when the photo is of a person or group of people) any adjustment of the saturation (color) may add less color to achieve an optimum in comparison to an amount of color added for a scene class of food (when the photo is of food). By way of example, in some embodiments there may be eight scene classes: (i) people, (ii) nature, (iii) sunrise and sunset, (iv) animals, (v) city, (vi) food, (vii) night and (viii) general (everything else). Other embodiments may include any subset of these scene classes, additional scene classes or different scene classes.

In some embodiments the target training images are distributed approximately evenly across the scene classes. In other words, there are approximately the same number of target training images associated with each of the scene classes. In some other embodiments the scene classes include a scene class of general and the general scene class has more images associated with it than the other classes. The other scene classes may have the same or approximately the same number of associated target training images to each other. Alternatively the other scene classes may have different numbers of target training images associated with them.

In step 303 the degradation models applicable to each of the scene classes are retrieved. The degradation models may be stored in computer storage, for example in the data storage 118 or in the non-transitory memory 210, in which case step 303 involves a read operation of the data storage. Alternatively the degradation models may form part of the executable software, for example part of the server application 114 or the client application 132, in which case step 303 involves a read operation of a sub-routine associated with the degradation model.

Each degradation model defines adjustments that may be made to one or more visual parameters of digital image data to degrade the image quality or otherwise adjust the image away from the target. In some embodiments, each degradation model defines the adjustments as a range of possible adjustments and the adjustment applied is selected randomly or according to a quasi-random selection process. Example visual parameters of digital image data that may be adjusted are: (i) brightness, (ii) contrast, (iii) saturation, (iv) vibrance, (v) whites, (vi) blacks, (vii) shadows and (viii) highlights. In some embodiments all of these visual parameters are adjustable. Other embodiments may include any subset of these visual parameters, additional visual parameters or different visual parameters.

In steps 304 to 306 a degradation model for the scene class of a target training image is applied to that target training image, to produce a lower quality image relative to the target training image. The degradation may be achieved by varying, for example by increasing or by decreasing, the value of any of the visual parameters of the digital image data. The varied visual parameter or parameters may include, for example, any one or more of the intensity or color attributes (e.g., brightness, contrast, saturation etc.).

In some embodiments each of steps 304 to 306 is automatic, in the sense that the varied visual parameters are selected and applied without user input, other than any user input required to initiate the process. The visual parameters could be controlled by the editing operations of an image editor, for by moving sliders representing the visual parameter to lower or higher values. These photo editing operations/sliders are often available in photo editing applications.

Taking for example the visual parameters of brightness or saturation, an increase of these parameters for a target training image will typically result in an image that looks overly exposed or too coloured, respectfully. Similarly, a decrease of these parameters for a target training image will typically result in an image that looks underexposed or dull, respectfully.

In some embodiments the variation of the visual parameters to apply the degradation model is at least partially random. For example, the selection of which visual parameters to vary may be selected according to a random or quasi-random process. The random selection may be constrained so that in most instances two or more visual parameters are varied. The random selection may allow for none of the visual parameters to be varied, but this may be a very rare event. Similarly the random selection may allow for all of the visual parameters of a degradation model to be varied, but his may be a rare event.

In addition, or alternatively, the selection of the value of the visual parameters may be random or quasi-random. In some embodiment the selection of the value of the visual parameters is from a range, where the range may be predetermined, based knowledge of values that ensure that a degraded image is produced.

In some embodiments the ranges may be determined empirically, by manually degrading the images (e.g. manually dragging the slider to set a new value for a visual parameter) and observing thresholds for the ranges. For example a minimum threshold may be when there is a visually discernible degradation of the image and a maximum threshold may be when the image starts to become unrecognisable or when a significant amount of detail starts to become lost.

In some embodiments, to assist incorporation of the visual parameters into machine learning, for example neural network training, the visual parameters are expressed as differentiable functions. Then, upper and lower ranges of the values from which a selection may be made are defined for each visual parameter. These upper and lower ranges may also be defined for each scene class. As mentioned above, these upper and lower ranges are selected to ensure degradation of the image either by overly increasing a visual parameter value of the image or by overly decreasing the visual parameter value, respectively. In some embodiments an element of quasi-random selection of visual parameter values is introduced by using a random or quasi-random selection process to select value within the upper range or the lower range. In some embodiments the process of selecting or determining a visual parameter value for a degraded image includes direct or indirect random selection of either the upper range or the lower range.

By way of an example implemented in PyTorch, the visual parameters of brightness and contrast may be expressed as:

```
import torch
def apply_brightness (input_tensor: torch.tensor, birghtnesss_factor:
torch.tensor) -> torch.tensor:
    """
    Apply brightness to the input tensor according to the brightness
value.
    Args:
        input_tensor (torch.tensor): The input tensor of shape (C, H, W).
        brightness_factor (torch.tensor): The brightness factor.
    Returns:
        torch.tensor: The output tensor of shape (C, H, W). """
    output_tensor = input_tensor + brightness_factor
    output_tensor = torch.clip (output_tensor, min= 0. 0, max=1. 0)
    return output_tensor
def apply_contrast(input_tensor: torch.tensor, contrast_factor:
torch.tensor) -> torch.tensor:
    """
    Apply contrast to the input tensor according to the contrast value.
    Args:
        input_tensor (torch.tensor): The input tensor of shape (C, H, W).
        contrast_factor (torch.tensor): The contrast factor.
    Returns:
        torch.tensor: The output tensor of shape (C, H, W). """
    if contrast_factor >= 0.0:
        scale = 1.0 / (1.0 - contrast_factor)
    else:
        scale= 1.0 + contrast_factor
    output_tensor = ((input_tensor - 0.5) * scale) + 0.5
    output_tensor = torch.clip(output_tensor, min= 0.0, max=1.0)
    return output_tensor
```

In some embodiments, a further or alternative element of quasi-random selection is introduced by associating each visual parameter an individual probability. This probability defines the chance whether this specific visual parameter is varied for a received target training image or not. Thus, during training of the image enhancement model a visual parameter value is sampled according to its probability. This ensures different combinations of visual parameters are applied. Accordingly, two or more degraded images will likely have different visual parameters adjusted, due to the quasi-random selection process. For example, one degraded image may be generated due to a variation in brightness and not saturation, another may be degraded to a variation in saturation and not brightness and another may be degraded due to a variation in both brightness and saturation.

In some embodiments a visual parameter value is randomly (uniformly) sampled from its corresponding upper or lower range. In other words, each value within each of the upper and lower ranges has an equal probability of being applied to generate the degraded image.

In other embodiments the probability is non-uniform. For example, the determination whether a value is sampled from the upper range or the lower range for a visual parameter may be performed randomly using a lower probability and a higher probability, respectively.

In a specific example, the saturation probabilities (expressed as a value in a range 0.00 to 1.00, so that 0.20 means a 1 in 5 probability) and value ranges for a scene class of “people” may be:

a) Probability that saturation is adjusted: 0.20;

b) If saturation is to be adjusted, then the probability of selecting from the low range: 0.80 (so probability of selecting from the high range is 0.20);

c) Values of the low range: −0.35 to 0.0; and d) Values of the high range: 0.45 to 0.65.

In another specific example, the brightness probabilities and value ranges for the scene class of “people”, which may be used in combination with saturation probabilities mentioned above, may be:

a) Probability that brightness is adjusted: 0.92;

b) If brightness is to be adjusted, then the probability of selecting from the low range: 0.80 (so probability of selecting from the high range is 0.20);

c) Values of the low range: −0.75 to 0.0; and d) Values of the high range: 0.45 to 0.75.

Therefore, in a combination of these two specific examples of visual parameters, saturation is varied 20% of the time and brightness varied 92% of the time. In other words, on average 20% of the degraded images have a saturation that was selected from the low or high range values for saturation and on average 92% of the degraded images have brightness selected from the low or high range values for brightness. Also, on average 18.4% of the degraded images have both the saturation and brightness varied. Of the 20%, that have saturation varied, 80% are desaturated by reducing saturation. In embodiments with uniform sampling across the ranges, on average the desaturated images are uniformly distributed over the range of −0.35 to 0.0.

Expanding this to other visual parameters for a scene class of people:

```
"people": {
  "whites": {
    "overall": 0.1,
    "low": {"p": 0.5, "min": −0.1, "max": 0.0},
    "high": {"p": 0.5, "min": 0.05, "max": 0.12},
  }
  "blacks": {
    "overall": 0.1,
    "low": {"p": 0.5, "min": −0.2, "max": 0.0},
    "high": {"p": 0.5, "min": 0.07, "max": 0.15},
  }
  "saturation": {
    "overall": 0.20,
    "low": {"p": 0.8, "min": −0.35, "max": 0.0},
    "high": {"p": 0.2, "min": 0.45, "max": 0.65},
  }
  "brightness": {
    "overall": 0.92,
    "low": {"p": 0.8, "min": −0.75, "max": 0.0},
    "high": {"p": 0.2, "min": 0.45, "max": 0.75},
  }
  "vibrance": {
    "overall": 0.80, #before 0.92
    "low": {"p": 0.8, "min": −0.80, "max": 0.0},
    "high": {"p": 0.2, "min": 0.60, "max": 0.80 },
  }
  "contrast": {
    "overall": 0.30,
    "low": {"p": 0.75, "min": −0.60, "max": 0.0},
    "high": {"p": 0.25, "min": 0.35, "max": 0.65},
  }
  "shadows": {
    "overall": 0.85,
    "low": {"p": 0.8, "min": −1.0, "max": 0.0},
    "high": {"p": 0.2, "min": 0. 70, "max": 1.0},
```

-continued

```
  }
  "highlights": {
    "overall": 0.35,
    "low": {"p": 0.2, "min": −0.5, "max": 0.0},
    "high": {"p": 0.8, "min": 0.2, "max": 0.7},
  },
},
```

And an example for a different scene class, in this example a scene class of “animals”:

```
"animals": {
  "whites": {
    "overall": 0.1,
    "low": {"p": 0.5, "min": −0.1, "max": 0.0},
    "high": {"p": 0.5, "min": 0.05, "max": 0.12},
  }
  "blacks": {
    "overall": 0.1,
    "low": {"p": 0.5, "min": −0.2, "max": 0.0},
    "high": {"p": 0.5, "min": 0.07, "max": 0.15},
  }
  "saturation": {
    "overall": 0.28,
    "low": {"p": 0.9, "min": −0.5, "max": 0.0},
    "high": {"p": 0.1, "min": 0.7, "max": 0.90 },
  }
  "brightness": {
    "overall": 0.92,
    "low": {"p": 0.9, "min": −1.0, "max": 0.0},
    "high": {"p": 0.1, "min": 0.45, "max": 0. 70},
  }
  "vibrance": {
    "overall": 0.92,
    "low": {"p": 0.9, "min": −1.0, "max": 0.0},
    "high": {"p": 0.1, "min": 0.85, "max": 1.0},
  }
  "contrast": {
    "overall": 0.25,
    "low": {"p": 0.5, "min": −0.65, "max": 0.0},
    "high": {"p": 0.5, "min": 0.0, "max": 0.65},
  }
  "shadows": {
    "overall": 1.0,
    "low": {"p": 0.8, "min": −1.0, "max": 0.0},
    "high": {"p": 0.2, "min": 0. 70, "max": 1.0},
  }
  "highlights": {
    "overall": 0.33,
    "low": {"p": 0.5, "min": −0.5, "max": 0.0},
    "high": {"p": 0.5, "min": 0.0, "max": 0.5},
  },
},
```

In the notation above, “overall” refers to the probability that the visual parameter value is adjusted, “low” refers to the values of the low range, “high” refers to the values of the high range, “p” refers to the probability of selecting from the range, “min” refers to the lowest value of the range and “max” refers to the highest value of the range.

In each of these two examples, the visual parameters that may be adjusted are: (i) brightness, (ii) contrast, (iii) saturation, (iv) vibrance, (v) whites, (vi) blacks, (vii) shadows and (viii) highlights. The collection of these visual parameters and their respective probability and range values for a scene class is described herein as a degradation model for that scene class. Other degradation models may have more or less visual parameters, and may have different visual parameters to those listed in the two examples above. Other degradation models may also have different probabilities and different ranges.

In some embodiments each target training image is processed once, so that a single degraded image is used for machine learning for each target training image. In other embodiments each target training image is processed using one or more random or quasi-random visual parameter selection processes two or more times, for example either or both of the processes described above, producing two or more degraded images for each target training image.

The generation of the degraded images for the target training images based on the target training images themselves avoids a need to collect pairs of less appealing/low aesthetics and corresponding high aesthetic enhanced images (called "supervised pairs" below) for machine learning. Instead, only the high aesthetic (or other target) images need to be collected. The computational processes above then generate one or more degraded images to pair with the high aesthetic images, creating what may be called "unsupervised pairs".

By way of illustration, a process of collecting supervised pairs may require hiring multiple photo experts. They are then asked to edit/enhance these low quality images to produce their corresponding high quality images. This whole process of supervised based learning has drawbacks. One is potential style biasness of a particular photo expert and another is the cost of hiring multiple photo experts for the task. Thus, a trained image enhancement model based on supervised pairs could potentially end up always enhancing an image with this style. Another potential drawback is the overall time spent to edit these images, which can be very substantial depending on the number of images. Another potential drawback is restrictions on the ability to collect a large amount of images, for example a number sufficient for data hungry large neural network based models.

While in some embodiments only unsupervised pairs of images are used for machine learning, in other embodiments a combination of supervised and unsupervised pairs of images are used. The use of unsupervised pairs may alleviate to some extent one or more of the problems of using supervised pairs. In various embodiments the unsupervised pairs form at least 20% or 30% or 40% or 50% or 60% or 70% or 80% or 90% of the image pairs used for machine learning.

Figure 4:
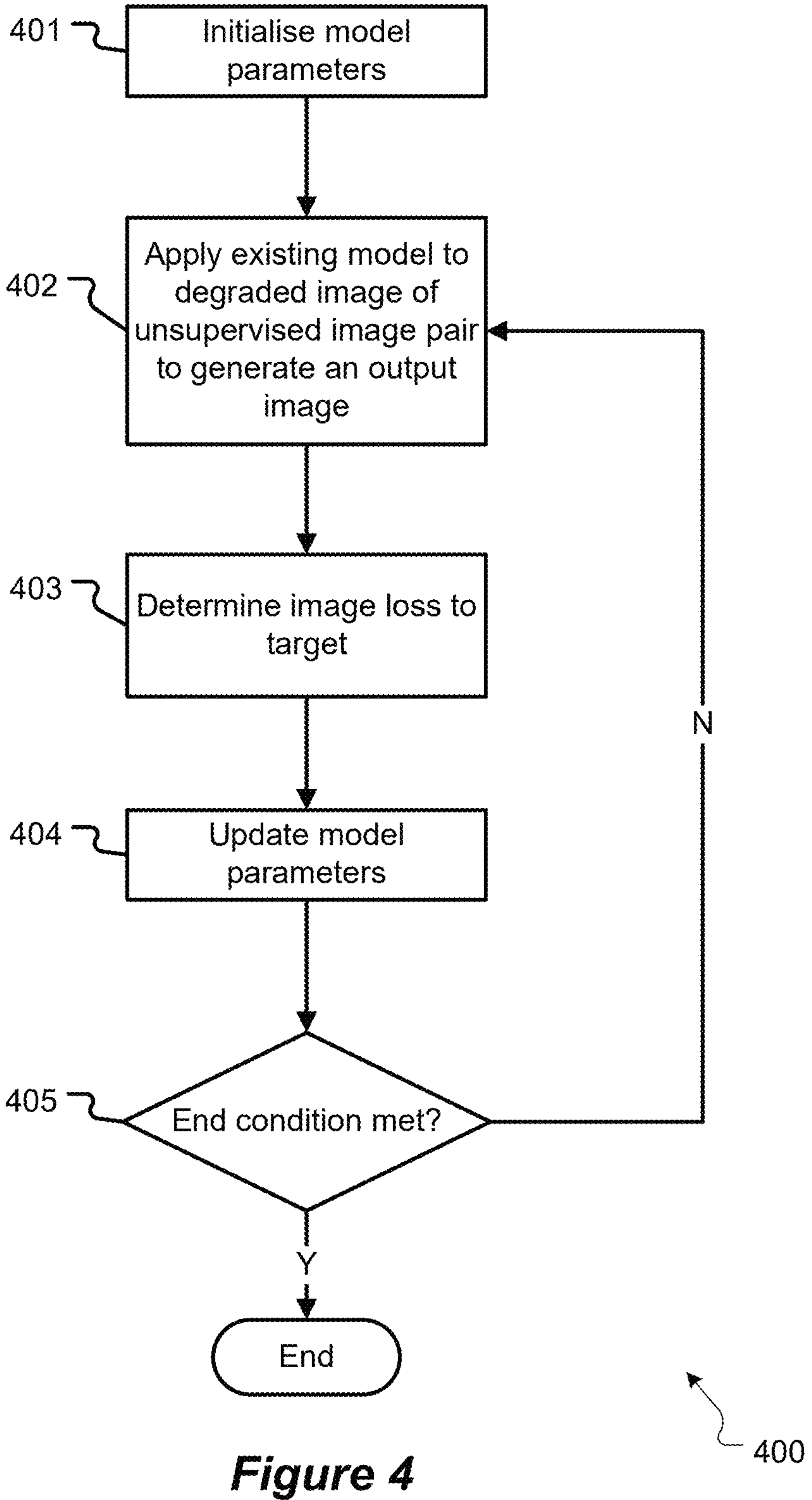
FIG. 4 shows a method for machine learning based on a generated set of training images, including a set of unsupervised image pairs, which may be generated in accordance with the method of FIG. 3.

FIG. 4 shows an embodiment of a method 400, performed by a data processing system. The operations of the method 400 may be performed, for example, by an instance of the computer processing system 200, in combination with implementation of the method 300. The method 400 is a method for machine learning based on a generated set of training images, including a set of unsupervised image pairs, which may be generated in accordance with the method 300.

In step 401 model parameters for machine learning of an image enhancement model are initialised. Taking the example of an image enhancement model in the form of a neural network, for instance a convolutional neural network, initialisation may include setting all weights of the image enhancement model to random values, according to a normal probability distribution or otherwise. The image enhancement model may be in a different form, for example a shared multilayer perceptron (MLP) network. Alternatively, and in particular for a convolutional neural network, initialisation may include using pre-trained weights, for example based on a preceding training of the image enhancement model. The preceding training may, for example, include training based on supervised pairs of images. The number of supervised pairs of images may be relatively small in comparison to training to be completed based on unsupervised pairs.

In step 402 data defining a degraded image of an unsupervised image pair in the set of unsupervised image pairs is received or retrieved from data storage and the existing image enhancement model, including the existing model parameters, are applied to the degraded image to generate an output image. In the first iteration of the method 400 the existing model parameters have their initialised values as set in step 401.

In step 403, an image loss is determined. The image loss is a measure of a difference between the output image and the target training image of the unsupervised image pair. An example of image loss is the mean squared error loss or "L2" loss. In step 404 the model parameters are updated-continuing with the example of a neural network, the updating may be by backpropagation, utilising gradient descent. As mentioned above, the visual parameters are expressed as differentiable functions to enable gradient descent. In an alternative embodiment, instead of using loss in the image space, the determined image loss may be between a representation of the output image and a representation of the target training image. An example representation that may be used is a colour histogram.

In step 405 a determination is made whether or not an end condition has been met. The end condition may, for example, be the image loss reaching a threshold value or a certain number of iterations being completed, for example when there are no further image pairs left for training. If the end condition has not been met, the process returns to step 402 and a further iteration is performed, based on another unsupervised image pair. If the end condition has been met, then training is complete.

While FIG. 4 and its associated description above discusses machine learning based on unsupervised image pairs only, as previously mentioned in other embodiments machine learning is based on both supervised and unsupervised image pairs. In that case, for some iterations step 402 involves applying the existing image enhancement model to the supervised image pairs.

In some embodiments machine learning involves utilising image classification in addition to an error based on characteristics of the image.

Figure 5:
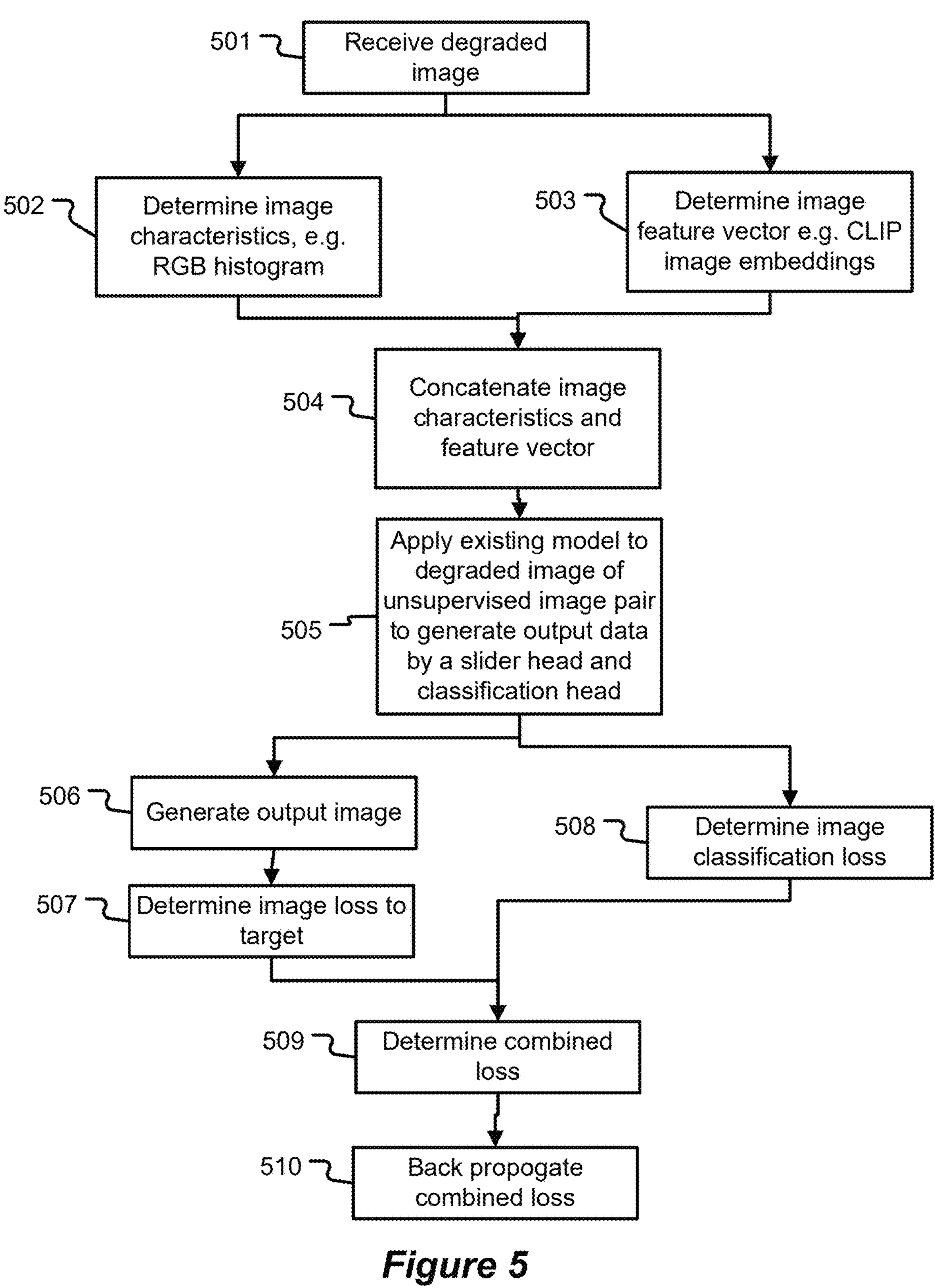
FIG. 5 shows another method for machine learning based on a generated set of training images, including a set of unsupervised image pairs, which may be generated in accordance with the method of FIG. 3.

FIG. 5 shows an embodiment of a method 500, performed by a data processing system, for utilising an image enhancement model. The operations of the method 500 may be performed, for example, by an instance of the computer processing system 200, in combination with implementation of the method 300. The method 500 is a method for machine learning based on a generated set of training images, including a set of unsupervised image pairs, which may be generated in accordance with the method 300.

In step 501 a degraded image is received. The degraded image may be an unsupervised image pair.

In step 502 characteristics of the degraded image are determined. These image characteristics define at least in part an aspect of difference between the target training image and the degraded image. In other words, they relate to the characteristics that will change between an input image and an output image of the trained model. For example, in the application of image processing to enhance photographic images, the image characteristics may represent overall colour and brightness semantics of the image. An example of image characteristics that represent overall colour and brightness semantics of the image is a colour histogram, for example a set of RGB histogram features or in other words an RGB histogram, which are extracted from the degraded image.

To facilitate concatenation with a feature vector (as per step 504 described herein below), the image characteristics are expressed as a vector. An RGB histogram is expressed as a vector by concatenating individual R, G and B histograms together. The length of this feature vector depends on the size of histogram bins. The size of the histogram bins may be viewed as a hyper-parameter for machine learning. For example, if the histogram bin size is taken as 32 then the feature vector length would be 3*32=96 (one for each channel). A suitable value for the size of the histograms may be determined by empirical testing and evaluating a range of values. An example set of values of the histogram bin sizes suitable for such testing and evaluation is: [32, 64, 96, 128, 192, 256].

In step 503 a feature vector of the degraded image is determined. The feature vector is determined based on the data defining the image itself. The feature vector is suitable for image classification, but is not determined based on the scene information that was associated with the target training image, whether in the metadata or otherwise. In some embodiments a trained classification model is used to determine a feature vector for classification and various machine learning architectures and models are known to be useful for image classification. An example is a neural network called CLIP by the A1 research and deployment company OpenAI, which is configurable to recognize and classify images into visual categories provided to it. Other pre-trained neural network based models may be used, for example a convolutional neural network or a transformer-based neural network. The visual categories provided or configuring the trained classification model match the scene information-see for example the description of FIG. 3, in particular step 302. In particular, the visual categories match the set of possible scene classes {1 to N}. At the time of writing CLIP encodes a received image into a feature vector, which is also known as a CLIP embedding, of length 512.

In steps 502 and 503 data defining a degraded image of an unsupervised image pair in the set of unsupervised image pairs is received or retrieved from data storage. The processing of degraded images may occur one by one or in batches, or all available degraded images in a training set of image pairs may be processed. Steps 502 and 503 may be performed in any order relative to each other, or in parallel.

In step 504 the image characteristics and feature vector of a degraded image are concatenated, forming in essence a single vector, called herein a combined feature vector. Thus, the length of the combined feature vector is the sum of the image characteristics vector and the feature vector, for example 512+96=608.

In step 505 the combined feature vector is applied to an existing state of the image enhancement model, to generate output data. In a first iteration, the existing state of the image enhancement model may be an initialisation state. Initialisation was described with reference to step 401 of FIG. 4. The output data includes a set of one or more visual parameters for the degraded image and also includes classification data, which may be a set of probabilities that the image is in one of the scene classes. Accordingly, continuing with the example described herein of eight visual parameters in the form of slider values and eight scene classes, the output data may be in the form of two eight value vectors. These outputs are from what is called a slider head and a classification head later herein.

In some embodiments the image enhancement model includes a shared network, for example a shared multilayer perceptron (MLP) network, with multiple layers of perceptrons. The MLP network is deployed to learn a projection of the combined feature vectors into a lower dimensionality. Continuing with the numerical examples previously provided, the MLP network may reduce the dimensionality from 608 to 128. The reduced vector length provides a compact representation or lower dimensionality representation of both the image characteristics and the feature vector.

In PyTorch from the Linux Foundation, an example of the architecture of the MLP to reduce dimensionality of a combined feature vector is:

```
self.shared_mlp = nn.Sequential (
  nn.LayerNorm(comb_feat_len)
  nn.Linear(comb_feat_len, 256),
  nn.LayerNorm(256),
  nn.LeakyReLU(negative_slope=Ie-2),
  nn.Linear(256, 128),
)
```

The image enhancement model includes or also includes two independent output networks, which may also be MLP networks. One such network is called herein a slider head and the other is called a classification head. The objective of the slider head is to learn the "optimal" slider values for each of the visual parameters (e.g. each of (i) brightness, (ii) contrast, (iii) saturation, (iv) vibrance, (v) whites, (vi) blacks, (vii) shadows and (viii) highlights), given the low dimensional feature vector coming from the shared MLP network when that is used, or otherwise from the higher dimensional combined feature vector. Similarly, the objective of the classification head is to learn the corresponding scene class (e.g. one of the eight total classes-(i) people, (ii) nature, (iii) sunrise and sunset, (iv) animals, (v) city, (vi) food, (vii) night and (viii) general (everything else)) present in the input low quality image. Thus, in the specific example of eight visual parameters and eight scene classes, both the heads contain eight output nodes. In other embodiments one or both of the slider head and the classification head may have a different number of output nodes.

In embodiments in which the image enhancement model includes both a shared network and two independent output networks, the output networks are attached to the MLP network. The combination therefore has as an input the combined feature vectors and two outputs, one being the visual parameter values and the other being class probabilities.

In PyTorch from the Linux Foundation, an example of the architecture of the MLP for each of the slider head and the classification head are:

```
self.classifier_head = nn.Sequential (
  nn.Linear(128, 64), nn.ReLU( ), nn.Linear(64, 32), nn.ReLU( ),
  num_classes)
)
self.slider_head = nn.Sequential (
  nn.Linear(128, 64), nn.ReLU( ), nn.Linear(64, 32), nn.ReLU( ),
num_slid_ops), nnSigmoid( ))
)
```

Using the image enhancement model there are two output networks, the outputs from the slider and classification heads. Therefore, two losses are computed during training of the image enhancement model.

In step 506, the visual parameter values output by the slider head are applied to the degraded image that was received and processed to produce the slider head output. The visual parameters output by the slider head may be viewed as predicted slider values by the enhancement model to achieve close or closer to the target training image corresponding to the degraded image. The result is a new output image with those visual parameters applied, which may be viewed as a predicted enhanced image.

In step 507 the predicted enhanced image is then compared with the target training image by computing the average mean squared error or L2 loss. An objective of model training is to reduce this difference (i.e., L2 loss) over the course of time.

In step 508, the class probability values output by the classification head are used to computer a multi-class cross entropy loss (MCE), with respect to the known scene information that was associated with the target training image, which in the example described herein above may be one of eight scene classes. A simultaneous objective of model training is to reduce this difference (i.e., MCE loss) over the course of time.

In some embodiments a combined objective to achieve the simultaneous objectives of reducing the L2 and MCE losses over time is formed by summing the losses. In particular the objective of model training is to reduce the sum of the two losses. In other embodiments a combined objective is defined as another combination of the image loss and image classification loss determined in steps 507 and 508 respectively. For example, the combined objective may be a weighted sum of the two losses or another mathematical combination of the two losses.

In step 509 gradients of the combined loss are computed using standard optimisation methods, for example stochastic gradient descent and then, these gradients are back propagated through the enhancement model. In particular, the back propagation is first through the slider and classification heads and then through the shared network. Like with the process of FIG. 4, the training is iterative, with steps 502 to 509 repeated until an end condition is met. For brevity the iterative process is not depicted in FIG. 5.

By training models together with scene information, the enhancement model learns to associate how much it should predict the values of the sliders when a certain scene class is present in the image. Therefore, the enhancement model can predict slider values in a certain range adaptively given the scene class, rather than predicting slider values irrespective of the scene class.

Figure 6:
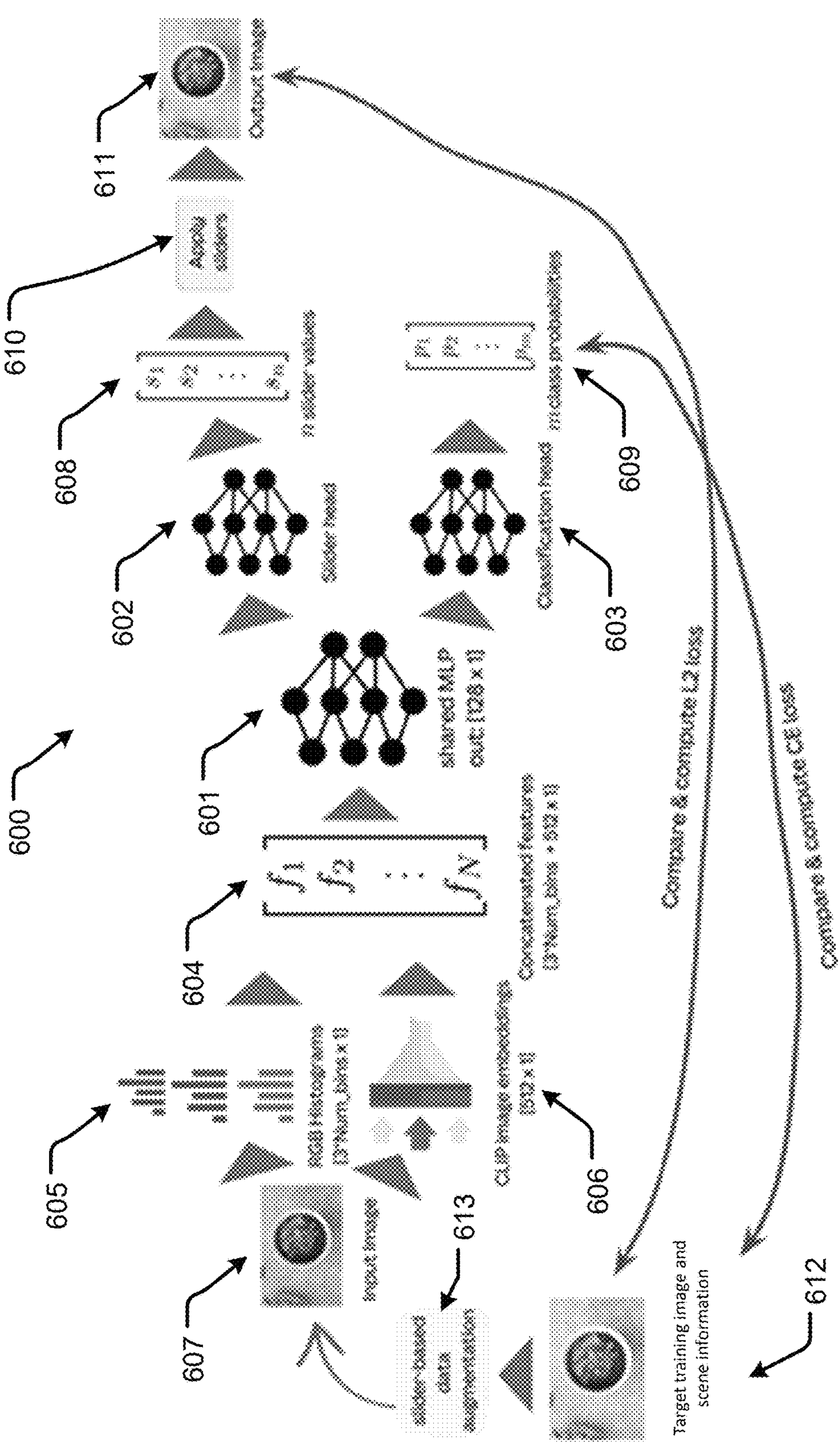
FIG. 6 is a diagrammatic representation of the operation of an image enhancement model.

FIG. 6 is a diagrammatic representation of the operation of an image enhancement model 600, for example as part of the process 500 of FIG. 5.

The image enhancement model 600 receives as an input a vector 604, which is a concatenation of serialised RGB histogram data and CLIP image embedding data. The vector 604 may, for example, be a vector of length that equals the length of the CLIP embedding, which may be 512, plus the combined length of the histogram bins, for example 96. A process for the formation of this input vector based on RGB histogram data 605 and a CLIP image embedding 606 for an input image 607 was described with reference to steps 502 to 504 of FIG. 5 and is therefore not repeated. The input image 607 may be a degraded image of a supervised image pair during training of the image enhancement model 600. During use of the trained image enhancement model 600, the input image 607 is an image to be enhanced by the model.

The image enhancement model 600 includes a shared MLP 601, which receives the vector 604 and reduces its dimensionality, for example to a vector of length 128. Both a slider head 602 and classification head 603 are attached to the shared MLP 601 and receive the reduced dimensionality (e.g. length 128) vector.

The image enhancement model 600 provides output data that includes both a visual parameter or slider value vector 608 and an image classification vector 609. The output data was described in more detail with reference to the process 500 of FIG. 5, in particular with reference to step 505. The slider value vector 608 is utilised in a process step 610 to generate an output image 611. During training both the output image 611 and the image classification vector 609 are utilised to compute loss and train the image enhancement model 600, for example as described with reference to steps 506 to 510 of FIG. 5. These processes are represented by arrows "Compare & compute L2 loss" and "Compare & compute CE loss" in FIG. 6. The output image 611 is compared to a target training image 612 and the image classification vector 609 is compared with the scene information for the target training image 612, in particular the scene class. In some embodiments the images used for training include or consist of unsupervised pairs, for example pairs of target training images and degraded images generated according to the process 300 of FIG. 3. The generation of unsupervised pairs is represented in FIG. 6 by process 613, "slider-based data augmentation".

After training, when the image enhancement model 600 is used for image enhancement only, then the slider value vector 608 is utilised, in particular by applying, in a process step 610, the visual parameters of the slider value vector 607 to generate or initiate a process to generate an output image 611. No L2 or other loss is determined based on the output image 608. A process for the generation of an output image was also described with reference to step 506 of FIG. 5.

In some embodiments the visual parameters of the slider values are automatically applied, without further human input beyond any input required to invoke the enhancement model 600 to an input image 607, to generate an output image 611. In other embodiments the process 610 includes human input steps. For example, a first output image may be generated that applies the visual parameters of the slider value vector 607 and presented to the user on a display device. The first output image may be indicated as a preview and in some embodiments may be at a lower resolution than a resolution of the output image 611, but it need not be. The user may be prompted to provide one or more inputs. For example a user may be prompted to accept or reject the applied visual parameters and/or may be given an opportunity to chance one or more, up to all, of the applied visual parameters. The first output image may be presented on the display together with sliders showing the applied visual parameters and the user interface may allow the user to adjust the sliders, to generate a second output image. This process may be completed once or repeatedly before the user settles on a final output image 611.

Without limiting the foregoing disclosure, particular embodiments of the present disclosure are described by the following clauses.

Clause A1: A method of training a machine learning model for image processing, the method including, by a computer processing system implementing a machine learning model:

for an image pair comprising a first image and a second image, wherein the first image is a degraded image, comprising degraded image characteristics relative to the second image, and the second image is a target image for machine learning:

a) applying a current machine learning model to the degraded image to produce a processed image output;

b) determining a loss for training, the loss for training comprising a loss between the processed image output and the target image;

c) updating parameters of the machine learning model based on the loss for training; and d) performing processes a) to c) for a plurality of other image pairs until an end condition is met, each of the other image pairs being different to the first image pair and each other, and each image pair comprising a said degraded image and a said target image;

wherein:

a plurality of, up to all of, the image pairs are unsupervised image pairs, wherein:

a said unsupervised image pair is one in which the degraded image has been generated by a computational process based on the target image of the unsupervised image pair;

the computational process comprises applying a selected degradation model to the target image;

the selected degradation model is one of a plurality of degradation models available for selection;

the selected degradation model for each of the plurality of unsupervised image pairs is selected based on classification information associated with the target image of that unsupervised image pair.

Clause A2: The method of clause A1, wherein the first image has a plurality of visual parameters with an associated parameter value, affecting how the first image appears relative to the second image.

Clause A3: The method of clause A2, wherein the one or more of the plurality of visual parameters include at least one of: (i) brightness, (ii) contrast, (iii) saturation, (iv) vibrance, (v) whites, (vi) blacks, (vii) shadows and (viii) highlights.

Clause A4: The method of clause A2 or clause A3, wherein the image pairs comprise a first image pair with a first set of the plurality of visual parameters and a second image pair with a second set of the plurality of visual parameters, the first set being different from the second set.

Clause A5: The method of clause A4, wherein the first set and the second set are mutually exclusive.

Clause A6: The method of clause A4, wherein the first set and the set include at least one common visual parameter.

Clause A7: The method of clause A2, wherein the one or more of the plurality of visual parameters were selected according to a random or quasi-random process.

Clause A8: The method of any one of clauses A2 to A7, wherein a first degradation model of the plurality of degradation models is associated with a first range of values for a first visual parameter of the plurality of visual parameters and a second degradation model of the plurality of degradation models is associated with a second range of values, different to the first range of values, for the first of the plurality of visual parameters and wherein the applying either the first or the second degradation model to the target image comprises determining a value for the first visual parameter from the first or the second range of values respectively.

Clause A9: The method of clause A8, wherein determining a value for the first visual parameter within the first or second range of values comprises a random or quasi-random selection process.

Clause A10: The method of any one of clauses A2 to A9, wherein the visual parameters are expressed as differentiable functions.

Clause A11: The method of any one of clauses A1 to A10, wherein the classification information associated with at least one of the target images identifies a class of one of: (i) people, (ii) nature, (iii) sunrise and sunset, (iv) animals, (v) city, (vi) food, and (vii) night.

Clause A12: The method of any one of clauses A1 to A11, wherein:

a) applying the current machine learning model to the degraded image also produces a first classification output; and b) the loss for training also comprises a loss between the first classification output and the classification information.

Clause A13: The method of clause A12, wherein the loss for training is a mathematical combination of the loss between the processed image output and the target image and the loss between the first classification output and the classification information.

Clause B1: A computer-implemented method for generating image pairs for training a machine learning model for image processing, the method including:

receiving a set of training images, comprising a first training image and a second training image, and scene information for the set of training images, the scene information indicating a first class of image for the first training image and a second class of image, different to the first class of image for the second training image;

selecting and applying one of a plurality of degradation models to the set of training images to form a set of degraded images corresponding to the set of training images, wherein the selecting is based on the scene information and comprises:

selecting a first degradation model of the plurality of degradation models for applying to the first training image based on the scene information indicating the first class of image for the first training image; and selecting a second degradation model of the plurality of degradation models, different to the first degradation model, for applying to the second training image based on the scene information indicating the second class of image for the second training image;

wherein each degraded image and corresponding training image forms an image pair for training a machine learning model.

Clause B2: The method of clause B1, wherein a first degradation model of the plurality of degradation models comprises a range of values for a visual parameter that affects the appearance of a said training image and wherein applying the first degradation model comprises selecting a value for the visual parameter from within the range of values according to a random or quasi-random process.

Clause B3: The method of clause B2, wherein the first degradation model comprises a plurality of ranges of values for the visual parameter and wherein applying the first degradation model comprises selecting a value for the visual parameter from within one of the ranges of values according to a random or quasi-random process.

Clause B4: The method of clause B1, wherein applying the first degradation model comprises varying at least one visual parameter of a said training image, wherein the method also includes selecting the at least one visual parameter according to a random or quasi-random selection process.

Clause B5: The method of clause B4, further comprising selecting a value for each of the selected visual parameters according to a random or quasi-random selection process.

Clause B6: The method of clause B5, wherein selecting a value for each of the selected visual parameters is according to a constrained selection process.

Clause B7: The method of clause B6, wherein the constrained selection process has one set of constraints for first degradation model and a second set of constraints, different to the first set of constraints for the second degradation model.

Clause B8: The method of any one of clauses B2 to B7, wherein the at least one visual parameter includes at least one of: (i) brightness, (ii) contrast, (iii) saturation, (iv) vibrance, (v) whites, (vi) blacks, (vii) shadows and (viii) highlights.

Clause B9: The method of any one of clauses B2 to B8, wherein the at least one visual parameter is each expressed as a differentiable function.

Clause B10: The method of any one of clauses B1 to B9, wherein the scene information associated identifies one of a plurality of available classes, wherein the plurality of available classes comprise one or more of: (i) people, (ii) nature, (iii) sunrise and sunset, (iv) animals, (v) city, (vi) food, and (vii) night.

Clause C1: A computer processing system including one or more computer processors and computer-readable storage, the computer processing system configured to perform the method of any one of the A clauses or any one of the B clauses.

Clause C2: Non-transitory computer-readable storage storing instructions for a computer processing system, wherein the instructions, when executed by the computer processing system cause the computer processing system to perform the method of any one of the A clauses or any one of the B clauses.

It will be understood that a degraded image, in the context of the present disclosure, means an image that differs from a target image. Image degradation is accordingly an objective difference, not a subjective difference. By way of illustration, a machine learning model could be trained to operate in either direction, by using what has been called the degraded images herein as the target training images and vice-versa.

Throughout the specification, unless the context clearly requires otherwise, the terms “first”, “second” and “third” are intended are intended to refer to individual instances of an item referred to and are not intended to require any specific ordering, in time or space or otherwise.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of training a machine learning model for image processing, the method including, by a computer processing system implementing a machine learning model:

for an image pair comprising a first image and a second image, wherein the first image is a degraded image, comprising degraded image characteristics relative to the second image, and the second image is a target image for machine learning:

a) applying a current machine learning model to the degraded image to produce a processed image output;

b) determining a loss for training, the loss for training comprising a loss between the processed image output and the target image;

c) updating parameters of the machine learning model based on the loss for training; and d) performing processes a) to c) for a plurality of other image pairs until an end condition is met, each of the other image pairs being different to the first image pair and each other, and each image pair comprising a said degraded image and a said target image;

wherein:

a plurality of, up to all of, the image pairs are unsupervised image pairs;

a said unsupervised image pair is one in which the degraded image has been generated by a computational process based on the target image of the unsupervised image pair;

the computational process comprises applying a selected degradation model to the target image;

the selected degradation model is one of a plurality of degradation models available for selection;

the selected degradation model for each of the plurality of unsupervised image pairs is selected based on scene classification information associated with the target image of that unsupervised image pair, the scene classification information being or defining a scene class of the target image.

2. The method of claim 1, wherein the first image has a plurality of visual parameters with an associated parameter value, affecting how the first image appears relative to the second image.

3. The method of claim 2, wherein the plurality of visual parameters include at least one of: (i) brightness, (ii) contrast, (iii) saturation, (iv) vibrance, (v) whites, (vi) blacks, (vii) shadows and (viii) highlights.

4. The method of claim 2, wherein the image pairs comprise a first image pair with a first set of the plurality of visual parameters and a second image pair with a second set of the plurality of visual parameters, the first set being different from the second set.

5. The method of claim 4, wherein the first set and the second set are mutually exclusive.

6. The method of claim 4, wherein the first set and the set include at least one common visual parameter.

7. The method of claim 2, wherein the plurality of visual parameters were selected according to a random or quasi-random process.

8. The method of claim 2, wherein a first degradation model of the plurality of degradation models is associated with a first range of values for a first visual parameter of the plurality of visual parameters and a second degradation model of the plurality of degradation models is associated with a second range of values, different to the first range of values, for the first of the plurality of visual parameters and wherein the applying either the first or the second degradation model to the target image comprises determining a value for the first visual parameter from the first or the second range of values respectively.

9. The method of claim 8, wherein determining a value for the first visual parameter within the first or second range of values comprises a random or quasi-random selection process.

10. The method of claim 2, wherein the visual parameters are expressed as differentiable functions.

11. The method of claim 1, wherein the classification information associated with at least one of the target images identifies a class of one of: (i) people, (ii) nature, (iii) sunrise and sunset, (iv) animals, (v) city, (vi) food, and (vii) night.

12. The method of claim 1, wherein:

a) applying the current machine learning model to the degraded image also produces a first classification output; and b) the loss for training also comprises a loss between the first classification output and the classification information.

13. The method of claim 12, wherein the loss for training is a mathematical combination of the loss between the processed image output and the target image and the loss between the first classification output and the classification information.

14. A computer processing system including one or more computer processors and computer-readable storage, the computer processing system configured to perform a method comprising:

for an image pair comprising a first image and a second image, wherein the first image is a degraded image, comprising degraded image characteristics relative to the second image, and the second image is a target image for machine learning:

a) applying a current machine learning model to the degraded image to produce a processed image output;

b) determining a loss for training, the loss for training comprising a loss between the processed image output and the target image;

c) updating parameters of the machine learning model based on the loss for training; and d) performing processes a) to c) for a plurality of other image pairs until an end condition is met, each of the other image pairs being different to the first image pair and each other, and each image pair comprising a said degraded image and a said target image;

wherein:

a plurality of, up to all of, the image pairs are unsupervised image pairs;

a said unsupervised image pair is one in which the degraded image has been generated by a computational process based on the target image of the unsupervised image pair;

the computational process comprises applying a selected degradation model to the target image;

the selected degradation model is one of a plurality of degradation models available for selection;

the selected degradation model for each of the plurality of unsupervised image pairs is selected based on scene classification information associated with the target image of that unsupervised image pair, the scene classification information being or defining a scene class of the target image.

15. Non-transitory computer-readable storage storing instructions for a computer processing system, wherein the instructions, when executed by the computer processing system cause the computer processing system to perform a method comprising:

for an image pair comprising a first image and a second image, wherein the first image is a degraded image, comprising degraded image characteristics relative to the second image, and the second image is a target image for machine learning:

a) applying a current machine learning model to the degraded image to produce a processed image output;

b) determining a loss for training, the loss for training comprising a loss between the processed image output and the target image;

c) updating parameters of the machine learning model based on the loss for training; and d) performing processes a) to c) for a plurality of other image pairs until an end condition is met, each of the other image pairs being different to the first image pair and each other, and each image pair comprising a said degraded image and a said target image;

wherein:

a plurality of, up to all of, the image pairs are unsupervised image pairs;

a said unsupervised image pair is one in which the degraded image has been generated by a computational process based on the target image of the unsupervised image pair;

the computational process comprises applying a selected degradation model to the target image;

the selected degradation model is one of a plurality of degradation models available for selection;

the selected degradation model for each of the plurality of unsupervised image pairs is selected based on scene classification information associated with the target image of that unsupervised image pair, the scene classification information being or defining a scene class of the target image.

* * * * *